United States Patent
Umayahara et al.

(10) Patent No.: US 8,722,266 B2
(45) Date of Patent: *May 13, 2014

(54) FUEL CELL SYSTEM

(75) Inventors: Kenji Umayahara, Miyoshi (JP); Michio Yoshida, Miyoshi (JP); Takeshi Maenaka, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 247 days.

This patent is subject to a terminal disclaimer.

(21) Appl. No.: 12/743,919

(22) PCT Filed: Nov. 11, 2008

(86) PCT No.: PCT/JP2008/070490
§ 371 (c)(1),
(2), (4) Date: May 20, 2010

(87) PCT Pub. No.: WO2009/066587
PCT Pub. Date: May 28, 2009

(65) Prior Publication Data
US 2010/0248054 A1 Sep. 30, 2010

(30) Foreign Application Priority Data
Nov. 21, 2007 (JP) ................................ 2007-301721

(51) Int. Cl.
*H01M 8/04* (2006.01)
(52) U.S. Cl.
USPC ........................................................ 429/432
(58) Field of Classification Search
USPC ........................................................ 429/432
See application file for complete search history.

(56) References Cited

U.S. PATENT DOCUMENTS

| 6,342,316 | B1 * | 1/2002 | Okamoto et al. | 429/424 |
| 2003/0194586 | A1 * | 10/2003 | Sugiura et al. | 429/13 |
| 2006/0029846 | A1 | 2/2006 | Konoto et al. | |
| 2006/0199049 | A1 | 9/2006 | Hu et al. | |
| 2007/0207355 | A1 | 9/2007 | Yoshida | |
| 2009/0098427 | A1 | 4/2009 | Reiser | |
| 2010/0055521 | A1 * | 3/2010 | Umayahara et al. | 429/23 |

FOREIGN PATENT DOCUMENTS

| JP | 60-030062 A | 2/1985 |
| JP | 61-284065 A | 12/1986 |
| JP | 62-113362 A | 5/1987 |
| JP | 07-142079 A | 6/1995 |
| JP | 07-169488 A | 7/1995 |

(Continued)

OTHER PUBLICATIONS

Office Action mailed Jan. 11, 2012 in U.S. Appl. No. 12/440,787 (related to present application).

(Continued)

*Primary Examiner* — Gregg Cantelmo
(74) *Attorney, Agent, or Firm* — Kenyon & Kenyon LLP

(57) ABSTRACT

A fuel cell system including a fuel cell for generating electric power upon receiving supply of a reactant gas and a controller for performing control for high potential avoidance with the upper limit of the output voltage of the fuel cell as a high potential avoidance voltage lower than the open end voltage thereof. The controller computes a larger system requirement power out of a system requirement power calculated from a load requirement and a system requirement power calculated from the high potential avoidance voltage as a system requirement power for the fuel cell.

4 Claims, 4 Drawing Sheets

(56) References Cited

FOREIGN PATENT DOCUMENTS

| | | | |
|---|---|---|---|
| JP | 11-026002 A | | 1/1999 |
| JP | 2002-199505 A | | 7/2002 |
| JP | 2003197210 A | * | 7/2003 |
| JP | 2004-173450 A | | 6/2004 |
| JP | 2004-227995 A | | 8/2004 |
| JP | 2005-026054 A | | 1/2005 |
| JP | 2005-158557 A | | 6/2005 |
| JP | 2005-251674 A | | 9/2005 |
| JP | 2005346979 A | * | 12/2005 |
| JP | 2007-109569 A | | 4/2007 |
| JP | 2007-115442 A | | 5/2007 |
| JP | 2008-218398 A | | 9/2008 |
| WO | 2006/030969 A1 | | 3/2006 |
| WO | WO 2006120822 A1 | * | 11/2006 |
| WO | WO 2007064317 A1 | * | 6/2007 |

OTHER PUBLICATIONS

Final Office Action mailed Apr. 19, 2012 in U.S. Appl. No. 12/440,787 (related to present application).

Office Action mailed on Feb. 5, 2014 in U.S. Appl. No. 12/440,787.

* cited by examiner

FUEL CELL SYSTEM

This is a 371 national phase application of PCT/JP2008/070490 filed 11 Nov. 2008, which claims priority to Japanese Patent Application No. 2007-301721 filed 21 Nov. 2007, the contents of which are incorporated herein by reference.

TECHNICAL FIELD

The present invention relates to a fuel cell system which controls the operation of a fuel cell while the upper limit of the output voltage thereof is a high potential avoidance voltage lower than an open end voltage.

BACKGROUND ART

A fuel cell stack is an electric power generation system which oxidizes a fuel by an electrochemical process to directly convert energy discharged owing to an oxidizing reaction into electric energy. The fuel cell stack comprises a membrane electrode assembly in which both side surfaces of a polymer electrolyte membrane for selectively transporting hydrogen ions are held by a pair of electrodes made of a porous material. Each of the pair of electrodes contains, as a main component, carbon powder which carries a platinum based metal catalyst, and comprises a catalyst layer which comes in contact with the polymer electrolyte membrane, and a gas diffusion layer formed on the surface of the catalyst layer and having both air permeability and electron conductivity.

In a fuel cell vehicle in which a fuel cell system is mounted as a power source, an electric power is generated by the fuel cell stack in a high output region having a satisfactory electric power generation efficiency, and the power is supplied to a traction motor from both the fuel cell stack and a secondary battery or only from the fuel cell stack. On the other hand, in a low output region having a poor electric power generation efficiency, operation control is performed so that the electric power generation of the fuel cell stack is temporarily halted to supply the power to the traction motor only from the secondary battery. This temporary halting of the operation of the fuel cell stack in a low load region having a low electric power generation efficiency of the fuel cell system is referred to as an intermittent operation. In the low load region where the electric power generation efficiency of the fuel cell system lowers, the intermittent operation can be performed to operate the fuel cell stack in a region having a high energy conversion efficiency, which can increase the efficiency of the whole fuel cell system.

In Japanese Patent Application Laid-Open No. 2007-109569, a fuel cell system which performs an intermittent operation is disclosed. In the fuel cell system disclosed in the publication, in a case where the cell voltage of a fuel cell stack which has shifted to an electric power generation halt state becomes lower than a predetermined value, an air compressor is driven again to replenish an oxygen gas to the fuel cell stack, and the shortage of oxygen in a cathode of the fuel cell stack is eliminated to recover the cell voltage, thereby preventing the delay of a response to a request for electric power generation. At this time, the cell voltage excessively rises owing to the excessive supply of the oxygen gas, and the deterioration of the fuel cell stack is promoted sometimes. This is because the platinum catalyst included in the catalyst layer of the membrane electrode assembly is ionized and eluted in a high potential environment. The above publication also discloses a method (hereinafter referred to as high potential avoidance control) which controls the electric power generation so that the cell voltage does not exceed a predetermined upper limit voltage (hereinafter referred to as the high potential avoidance voltage), to avoid the above disadvantage.

Patent Document 1: Japanese Patent Application Laid-Open No. 2007-109569

DISCLOSURE OF THE INVENTION

Means for Solving the Problem

In a case where high potential avoidance control is also performed when a load from a fuel cell stack is required as in the case of vehicle running or the like, however, a system requirement power calculated from a high potential avoidance voltage does not necessarily match that calculated from the load requirement. Therefore, when a cell operation is controlled based on the system requirement power calculated from the load requirement, the shortage of the supply of a fuel gas is caused sometimes. This respect will be described with reference to FIGS. 5 and 6.

FIG. 5 shows an I-V characteristic (current/voltage characteristic) curve of the fuel cell stack, A is an operation point calculated from the load requirement, and B is an operation point calculated from the high potential avoidance voltage. Moreover, $I_A$ and $V_A$ are a current command value and a voltage command value calculated from the load requirement. $I_B$ and $V_B$ are a current command value and a voltage command value calculated from the high potential avoidance voltage. A control command value is a value of the operation point A, but an actual operation point is the operation point B. Therefore, as shown in FIG. 5, in the case of $I_A < I_B$, the shortage of the supply of the fuel gas occurs, and electric power generation becomes unstable.

FIG. 6 shows an I-P characteristic (current/power characteristic) curve of the fuel cell stack, A is an operation point calculated from the load requirement, and B is an operation point calculated from the high potential avoidance voltage. Moreover, $I_A$ and $P_A$ are a current command value and a voltage command value calculated from the load requirement. $I_B$ and $P_B$ are a current command value and a voltage command value calculated from the high potential avoidance voltage. A control command value is a value of the operation point A, but an actual operation point is the operation point B. Therefore, as shown in FIG. 6, in the case of $P_A < P_B$, the power generated excessively as compared with the control command value is charged into a secondary battery, which might cause the overcharging of the secondary battery.

To solve the problem, the present invention has been developed in view of the above problems, and an object thereof is to provide a fuel cell system which can properly control power generation during a high potential avoidance operation.

Means for Solving the Problem

To achieve the above object, a fuel cell system according to the present invention comprises a fuel cell which generates an electric power upon receiving supply of a reactant gas; a controller which performs control for high potential avoidance with the upper limit of the output voltage of the fuel cell as a high potential avoidance voltage lower than the open end voltage thereof; and a system requirement power computation device which computes a larger system requirement power out of a system requirement power calculated from a load requirement and a system requirement power calculated from the high potential avoidance voltage as a system requirement power for the fuel cell.

The system requirement power calculated from the high potential avoidance voltage is taken into account, and the system requirement power for the fuel cell is calculated, whereby the power generation can properly be controlled during a high potential avoidance operation.

Here, the system requirement power calculated from the high potential avoidance voltage is calculated from a relation between voltage/power characteristics of the fuel cell and the high potential avoidance voltage. The system requirement power calculated from the load requirement is calculated as an added value of a running power requirement value of a vehicle, a power consumption value of auxiliary machines and a charging/discharging requirement value of an accumulator.

In a preferable configuration of the present invention, the fuel cell system further comprises an accumulator which accumulates a part of the electric power generated by the fuel cell, and a charging/discharging controller which performs the feedback control of the charging/discharging of the accumulator so that the amount of the electric power to be charged into the accumulator matches a target value. The charging/discharging controller prohibits the feedback control on a condition that the high potential avoidance control is allowed.

When the high potential avoidance operation is performed, the electric power is charged into the accumulator in excess of the requirement power of the accumulator, and an integral term of the feedback control is wrongly integrated sometimes. In such a case, the feedback control can be prohibited to avoid the wrong integration of the integral term and to avoid the breakdown of the feedback control.

Effect of the Invention

According to the present invention, electric power generation can properly be controlled during a high potential avoidance operation.

DESCRIPTION OF REFERENCE NUMERALS

10 . . . fuel cell system, 20 . . . fuel cell stack, 30 . . . oxidizing gas supply system, 40 . . . fuel gas supply system, 50 . . . electric power system, and 60 . . . controller.

BEST MODE FOR CARRYING OUT THE INVENTION

Hereinafter, an embodiment according to the present invention will be described with reference to drawings.

Figure 1:
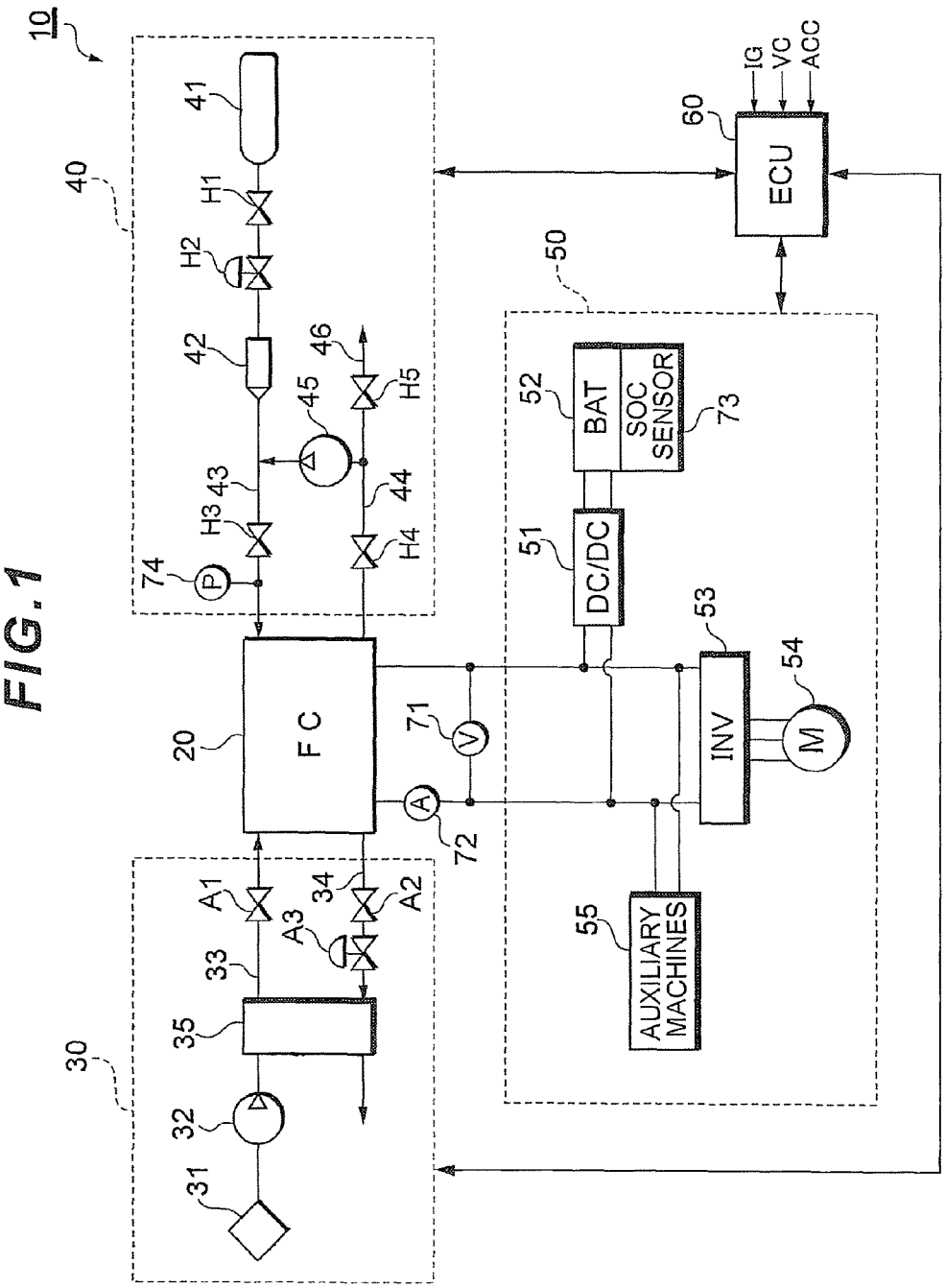
FIG. 1 is a system constitution diagram of a fuel cell system according to the present embodiment.

FIG. 1 shows a system constitution of a fuel cell system 10 which functions as a car-mounted power source system of a fuel cell vehicle.

The fuel cell system 10 functions as the car-mounted power source system mounted in the fuel cell vehicle, and comprises a fuel cell stack 20 which receives supply of a reactant gas (a fuel gas, an oxidizing gas) to generate an electric power; an oxidizing gas supply system 30 which supplies air as the oxidizing gas to the fuel cell stack 20; a fuel gas supply system 40 which supplies a hydrogen gas as the fuel gas to the fuel cell stack 20; an electric power system 50 which controls charging/discharging of the power; and a controller 60 which generally controls the whole system.

The fuel cell stack 20 is a solid polymer electrolyte type cell stack in which a large number of cells are stacked in series. In the fuel cell stack 20, an oxidizing reaction of formula (1) occurs in an anode, and a reducing reaction of formula (2) occurs in a cathode. An electromotive reaction of formula (3) occurs in the whole fuel cell stack 20.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

A voltage sensor 71 for detecting the output voltage (FC voltage) of the fuel cell stack 20 and a current sensor 72 for detecting an output current (FC current) are attached to the fuel cell stack 20.

The oxidizing gas supply system 30 comprises an oxidizing gas flow path 33 through which the oxidizing gas to be supplied to the cathode of the fuel cell stack 20 flows and an oxidizing off-gas flow path 34 through which an oxidizing off-gas discharged from the fuel cell stack 20 flows. The oxidizing gas flow path 33 is provided with an air compressor 32 which takes in the oxidizing gas from the atmosphere via a filter 31; a humidifier 35 which humidifies the oxidizing gas pressurized by the air compressor 32; and a shutoff valve A1 which shuts off the supply of the oxidizing gas to the fuel cell stack 20. The oxidizing off-gas flow path 34 is provided with a shutoff valve A2 which shuts off the discharge of the oxidizing off-gas from the fuel cell stack 20; a back-pressure regulator A3 which regulates the supply pressure of the oxidizing gas; and a humidifier 15 which exchanges water between the oxidizing gas (dry gas) and the oxidizing off-gas (wet gas).

The fuel gas supply system 40 comprises a fuel gas supply source 41; a fuel gas flow path 43 through which the fuel gas to be supplied from the fuel gas supply source 41 to the anode of the fuel cell stack 20 flows; a circulation flow path 44 which returns a fuel off-gas discharged from the fuel cell stack 20 to the fuel gas flow path 43; a circulation pump 45 which supplies under pressure the fuel off-gas from the circulation flow path 44 to the fuel gas flow path 43; and a gas/water discharge flow path 46 branched and connected to the circulation flow path 44.

The fuel gas supply source 41 is constituted of, for example, a high pressure hydrogen tank, a hydrogen storing alloy or the like, and stores the hydrogen gas having a high pressure (e.g., from 35 MPa to 70 MPa). When a shutoff valve H1 is opened, the fuel gas flows out of the fuel gas supply source 41 to the fuel gas flow path 43. The pressure of the fuel gas is decreased to, for example, about 200 kPa by a regulator H2 or an injector 42, and the gas is supplied to the fuel cell stack 20.

It is to be noted that the fuel gas supply source 41 may be constituted of a reformer which forms a hydrogen-rich reforming gas from a hydrocarbon based fuel, and a high pressure gas tank which brings the reforming gas formed by the reformer into a high pressure state to store the pressure.

The fuel gas flow path 43 is provided with the shutoff valve H1 which shuts off or allows the supply of the fuel gas from the fuel gas supply source 41; the regulator H2 which regulates the pressure of the fuel gas; the injector 42 which controls the amount of the fuel gas to be supplied to the fuel cell stack 20; a shutoff valve H3 which shuts off the supply of the fuel gas to the fuel cell stack 20; and a pressure sensor 74.

The regulator H2 is a device which regulates an upstream pressure (a primary pressure) into a preset secondary pressure and which is constituted of, for example, a mechanical type pressure reduction valve which decreases the primary pressure or the like. The mechanical type pressure reduction valve comprises a housing in which a back-pressure chamber and a pressure regulation chamber are formed via a diaphragm, and has a constitution in which the primary pressure is decreased to a predetermined pressure by the back pressure in the back-pressure chamber to obtain the secondary pressure in the pressure regulation chamber. The regulator H2 is disposed on the upstream side of the injector 42, whereby the upstream pressure of the injector 42 can effectively be decreased. This increases the degree of the freedom of the design of the mechanical structure (a valve body, housing, flow path, driving device, etc.) of the injector 42. Moreover, since the upstream pressure of the injector 42 can be decreased, it is possible to prevent that the valve body of the injector 42 does not easily move owing to the increase of a difference between the upstream pressure and downstream pressure of the injector 42. Therefore, the variable pressure regulation width of the downstream pressure of the injector 42 can be broadened, and the response of the injector 42 can be inhibited from being lowered.

The injector 42 is an electromagnetic driving type on-off valve in which a valve body can directly be driven by an electromagnetic driving force in a predetermined drive cycle and detached from a valve seat to regulate the flow rate and pressure of the gas. The injector 42 comprises the valve seat having a jet hole which injects a gas fuel of the fuel gas or the like, and also comprises a nozzle body which supplies and guides the gas fuel to the jet hole, and the valve body which is received and held movably in an axis direction (a gas flow direction) with respect to the nozzle body to open and close the jet hole.

In the present embodiment, the valve body of the injector 42 is driven by a solenoid as an electromagnetic driving device, and a pulse-like excitation current supplied to this solenoid can be turned on and off to switch the opening area of the jet hole in two stages. The gas jet time and gas jet timing of the injector 42 are controlled by a control signal output from the controller 60 to control the flow rate and pressure of the fuel gas with a high precision. The injector 42 directly drives the valve (the valve body and valve seat) by the electromagnetic driving force to open and close the valve, and the drive cycle can be controlled up to a high response region, whereby the injector has high response properties. In the injector 42, to supply the gas to the downstream side thereof with a demanded gas flow rate, at least one of the opening area (open degree) and opening time of the valve body provided along the gas flow path of the injector 42 is changed, thereby regulating the flow rate of the gas to be supplied to the downstream side (or a hydrogen molar concentration).

The circulation flow path 44 is connected to a shutoff valve H4 which shuts off the discharge of the fuel off-gas from the fuel cell stack 20 and the gas/water discharge flow path 46 branched from the circulation flow path 44. The gas/water discharge flow path 46 is provided with a gas/water discharge valve H5. The gas/water discharge valve H5 operates by a command from the controller 60 to discharge the fuel off-gas including impurities and the water to the outside of the circulation flow path 44. When the gas/water discharge valve H5 is opened, the concentration of the impurities of the fuel off-gas in the circulation flow path 44 decreases, and the concentration of hydrogen in the fuel off-gas circulated through a circulation system can be increased.

The fuel off-gas discharged via the gas/water discharge valve H5 is mixed with the oxidizing off-gas flowing through the oxidizing off-gas flow path 34, and is diluted by a diluter (not shown). The circulation pump 45 is driven by a motor to circulate and supply the fuel off-gas in the circulation system to the fuel cell stack 20.

The electric power system 50 comprises a DC/DC converter 51, a battery 52, a traction inverter 53, a traction motor 54 and auxiliary machines 55. The fuel cell system 10 has a constitution of a parallel hybrid system in which the DC/DC converter 51 and the traction inverter 53 are connected in parallel with the fuel cell stack 20. The DC/DC converter 51 has a function of raising a direct-current voltage supplied from the battery 52 to output the voltage to the traction inverter 53, and a function of lowering the pressure of a direct-current power generated by the fuel cell stack 20 or a regenerative power collected by the traction motor 54 by regenerative braking to charge the power into the battery 52. By these functions of the DC/DC converter 51, the charging/discharging of the battery 52 is controlled. Moreover, by the voltage conversion control of the DC/DC converter 51, the operation point (the output voltage, the output current) of the fuel cell stack 20 is controlled.

The battery 52 functions as a storage source of a surplus power, a regenerative energy storage source during the regenerative braking, or an energy buffer during load fluctuation accompanying the acceleration or deceleration of the fuel cell vehicle. As the battery 52, for example, a nickel/cadmium accumulator battery, a nickel/hydrogen accumulator battery, or a secondary battery such as lithium secondary battery is suitable. An SOC sensor for detecting a state of charge (SOC) is attached to the battery 52.

The traction inverter 53 is, for example, a PWM inverter driven by, for example, a pulse width modulation system, and converts a direct-current voltage output from the fuel cell stack 20 or the battery 52 into a three-phase alternate-current voltage in accordance with the control command from the controller 60 to control the rotation torque of the traction motor 54. The traction motor 54 is, for example, a three-phase alternate-current motor, and constitutes a power source of the fuel cell vehicle.

The auxiliary machines 55 generically include motors arranged in units of the fuel cell system 10 (e.g., power sources for pumps, etc.), inverters for driving these motors, and various car-mounted auxiliary machines (e.g., the air compressor, the injector, a cooling water circulation pump, a radiator, etc.).

The controller 60 is a computer system including a CPU, an ROM, an RAM and an input/output interface, and controls the units of the fuel cell system 10. For example, the controller 60 starts the operation of the fuel cell system 10 upon receiving a start signal IG output from an ignition switch, and calculates a vehicle running power or auxiliary machine power consumption based on an accelerator pedal open degree signal ACC output from an accelerator pedal sensor, a vehicle speed signal VC output from a vehicle speed sensor or the like. Moreover, the controller 60 controls the power generation with a larger system requirement power out of a system requirement power calculated from the total value of the vehicle running power and the auxiliary machine power consumption and a system requirement power calculated from the high potential avoidance voltage as a system requirement power for the fuel cell stack 20. The details of the computation of the system requirement power will be described later.

Here, auxiliary machine power includes power consumed by car-mounted auxiliary machines (the humidifier, air compressor, hydrogen pump, cooling water circulation pump, etc.), power consumed by devices necessary for the vehicle running (a transmission, wheel control device, steering device, suspension device, etc.), power consumed by devices arranged in a passenger space (an air conditioner, light fixture, audio, etc.) and the like.

Moreover, the controller 60 determines the distribution of the output power of the fuel cell stack 20 and the battery 52, and controls the oxidizing gas supply system 30 and the fuel gas supply system 40 so that the amount of the power to be generated by the fuel cell stack 20 matches a target power. Moreover, the controller controls the DC/DC converter 51 to regulate the output voltage of the fuel cell stack 20, thereby controlling the operation point of the fuel cell stack 20 (the output voltage, the output current). Furthermore, the controller 60 outputs, for example, alternate-current voltage command values of U, V and W-phases as switching commands to the traction inverter 53 so as to obtain a target torque in accordance with the accelerator pedal open degree, thereby controlling the output torque and rotation number of the traction motor 54.

Figure 2:
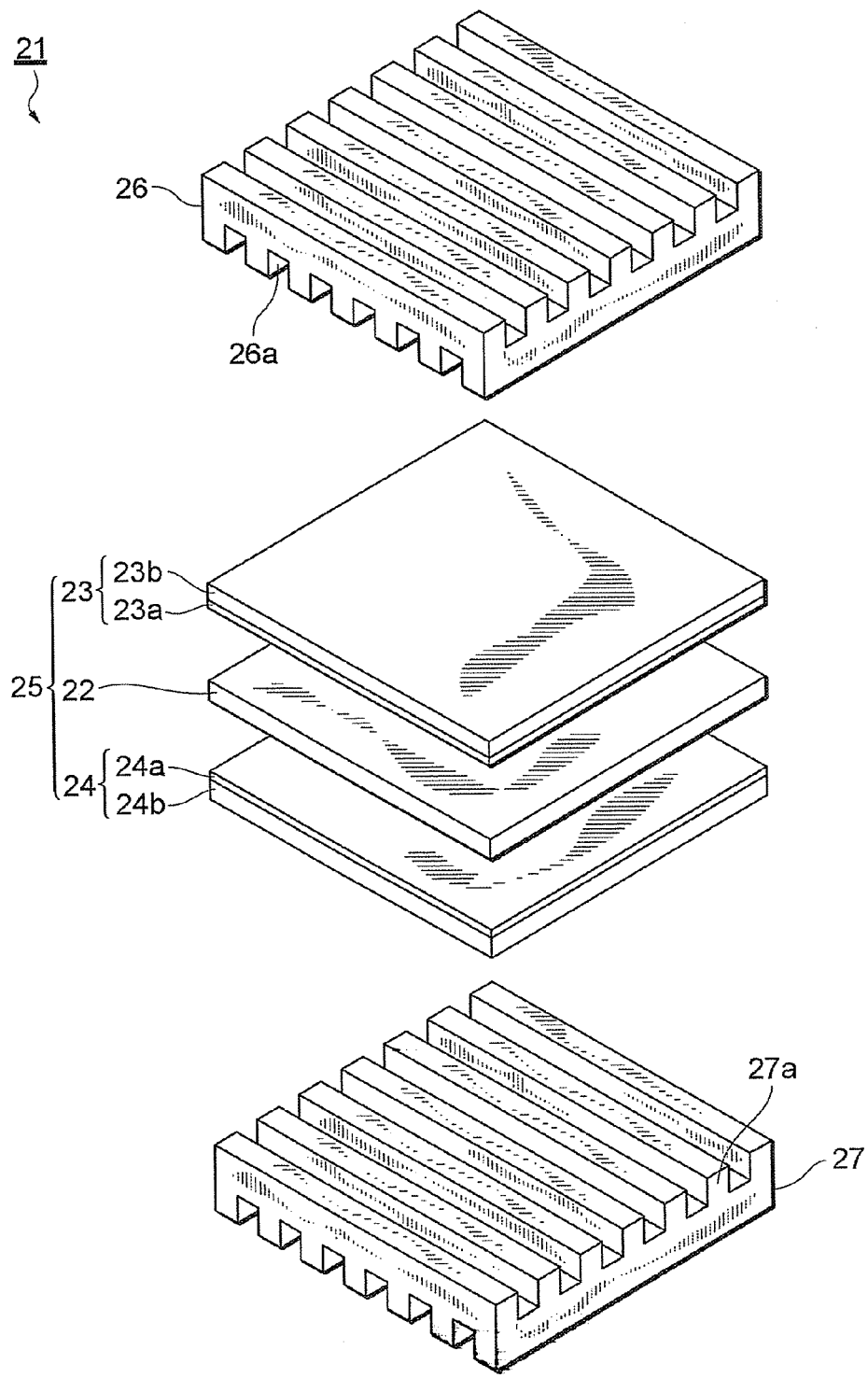
FIG. 2 is an exploded perspective view of cells constituting a fuel cell stack.

FIG. 2 is an exploded perspective view of a cell 21 constituting the fuel cell stack 20.

The cell 21 is constituted of a polymer electrolyte membrane 22, an anode 23, a cathode 24, and separators 26 and 27. The anode 23 and the cathode 24 are diffusion electrodes which sandwich the polymer electrolyte membrane 22 from both sides to form a sandwich structure. The separators 26 and 27 made of a gas-impermeable conductive material form passages of the fuel gas and the oxidizing gas between the anode 23 and the cathode 24 while further sandwiching this sandwich structure from both sides. In the separator 26, ribs 26a having concave cross sections are formed. The anode 23 abuts on the ribs 26a to close open portions of the ribs 26a, thereby forming the fuel gas passage. In the separator 27, ribs 27a having concave cross sections are formed. The cathode 24 abuts on the ribs 27a to close open portions of the ribs 27a, thereby forming the oxidizing gas passage.

The anode 23 contains, as a main component, carbon powder carrying a platinum-based metal catalyst (Pt, Pt—Fe, Pt—Cr, Pt—Ni, Pt—Ru or the like), and comprises a catalyst layer 23a which comes in contact with the polymer electrolyte membrane 22, and a gas diffusion layer 23b formed on the surface of the catalyst layer 23a and having both air permeability and electron conductivity. Similarly, the cathode 24 comprises a catalyst layer 24a and a gas diffusion layer 24b. More specifically, as to the catalyst layers 23a and 24a, carbon powder carrying platinum or an alloy of platinum and another metal is dispersed in an appropriate organic solvent, and an appropriate amount of an electrolyte solution is added thereto, whereby the resultant pasted material is screen-printed on the polymer electrolyte membrane 22. The gas diffusion layers 23b, 24b are made of a carbon cloth woven by use of a carbon fiber, carbon paper or carbon felt. The polymer electrolyte membrane 22 is a proton conductive ion exchange membrane made of a solid polymer material such as a fluorine based resin, and exerts a satisfactory electric conductivity in a wet state. The polymer electrolyte membrane 22, the anode 23 and the cathode 24 form a membrane electrode assembly 25.

Next, executing conditions and prohibiting conditions of high potential avoidance control will be described.

Examples of the executing conditions of the high potential avoidance control include (A1) the SOC of the battery 52 is SOC1 (e.g., 70%) or less, (B1) the vehicle is not performing the regenerative braking, and (C1) the detection of gas leakage based on the piping pressure of the oxidizing gas supply system 30 (the detection value of the pressure sensor 74) is not being judged, and all the Conditions are satisfied. On the other hand, examples of the prohibiting conditions of the high potential avoidance control include (A2) the SOC of the battery 52 is SOC2 (e.g., 75%) or more, (B2) the vehicle is performing the regenerative braking, and (C2) the detection of the gas leakage based on the piping pressure of the oxidizing gas supply system 30 is being judged, and one of these conditions is satisfied.

When the executing conditions of the high potential avoidance control are satisfied, the output voltage of the fuel cell stack 20 is limited to be not more than a high potential avoidance voltage (use upper limit voltage) which is lower than the open end voltage thereof. The high potential avoidance voltage preferably satisfies a condition that the voltage is in such a voltage range that the platinum catalyst included in the catalyst layers 23a, 24a of the fuel cell stack 20 is not eluted. Furthermore, in addition to the condition, the voltage preferably satisfies a condition that in a case where the output voltage of the fuel cell stack 20 is kept at the high potential avoidance voltage while the supply of the reactant gas to the fuel cell stack 20 is stopped, the voltage is in such a range that the electric power generated by the fuel cell stack 20 can be consumed by the auxiliary machines 55. In the fuel cell stack 20, the platinum catalyst of the catalyst layer 24a might be eluted especially when the potential of the cathode 24 is kept to be high, for example, during a low-density current operation or an idle operation. The high potential avoidance voltage may be a variable control value which varies in accordance with the SOC of the battery 52, the power consumption of the auxiliary machines 55 or the like.

On the other hand, when the prohibiting conditions of the high potential avoidance control are satisfied, the output voltage of the fuel cell stack 20 is allowed to rise up to the open end voltage thereof.

It is to be noted that it has been described above that judgment conditions for switching on/off the high potential avoidance control function are set on the basis of the SOC of the battery 52, but the judgment conditions for switching on/off the high potential avoidance control function may be set on the basis of the charging ability of the battery 52. For example, when the charging ability of the battery 52 is Win1 (e.g., −4 kW) or less, the high potential avoidance control function is switched on. When the charging ability of the battery 52 is Win2 (e.g., −2 kW) or more, the high potential avoidance control function may be switched off. However, the judgment conditions for switching on/off the high potential avoidance control function do not necessarily need to have hysteresis characteristics. Moreover, as the executing conditions of the high potential avoidance control, the above (A1) to (C1) may be changed to another condition, or a further condition may be added. As the prohibiting conditions of the high potential avoidance control, the above (A2) to (C2) may be changed to another condition, or a further condition may be added.

Next, a computation method of the system requirement power for the fuel cell stack 20 will be described.

Figure 3:
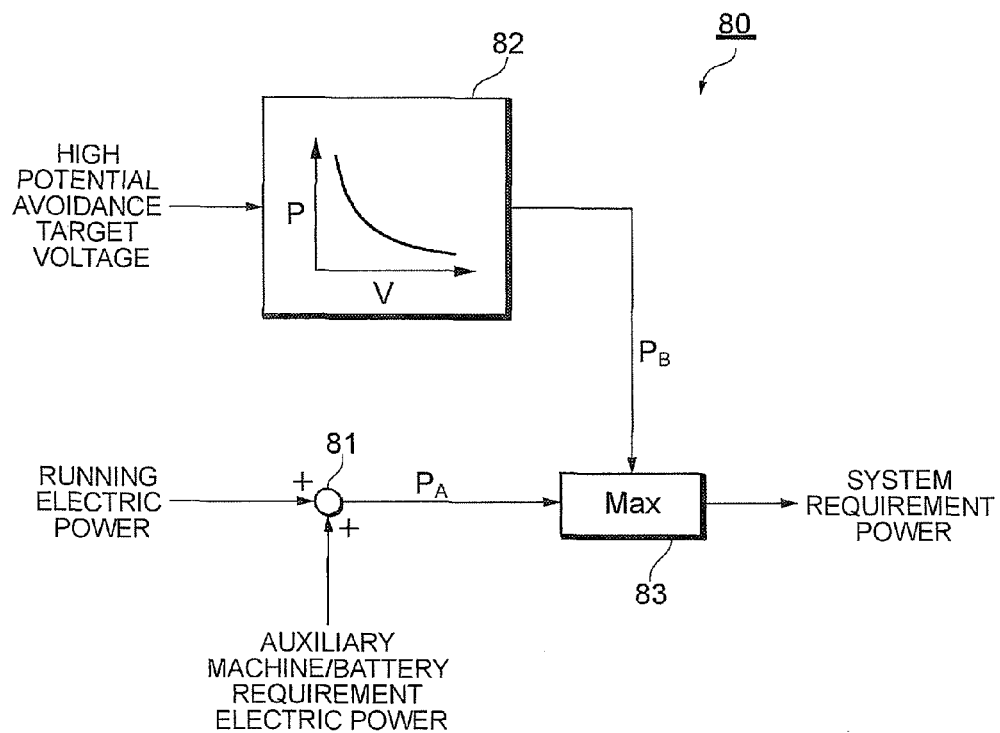
FIG. 3 is a block diagram of a system requirement power computing function.

FIG. 3 is a block diagram showing a system requirement power computing function 80. The controller 60 functions as a system requirement power computation device, and the system requirement power computing function 80 is realized by a CPU computing function in the controller 60. The system requirement power computing function 80 inputs the running power requirement value of the vehicle (the driving power of the traction motor 54), the power consumption value of the auxiliary machines 55 and the charging/discharging requirement value of the battery 52 into an adder 81 to calculate a system requirement power $P_A$ as the total value of them. The system requirement power $P_A$ is a power command value calculated from a load requirement. The system requirement power computing function 80 calculates a system requirement power $P_B$ from the high potential avoidance target voltage with reference to a V-P characteristic map 82. The system requirement power $P_B$ is a power command value calculated from the high potential avoidance voltage. Here, the V-P characteristic map 82 is means for estimating the voltage/power characteristics of the fuel cell stack 20, and is stored as map data in the ROM of the controller 60. A maximum value function 83 compares $P_A$ and $P_B$, and outputs a larger value out of them as the system requirement power for the fuel cell stack 20. Based on the system requirement power finally calculated in this manner, the controller 60 determines an actual operation point (an operation current, an operation voltage), and further obtains a power generation command value corresponding to the actual operation point to control the oxidizing gas supply system 30, the fuel gas supply system 40 and the electric power system 50.

In the process of computing the system requirement power for the fuel cell stack 20, the controller 60 takes into account not only the system requirement power $P_A$ calculated from the load requirement but also the system requirement power $P_B$ calculated from the high potential avoidance voltage, whereby the shortage of the fuel does not occur, and the electric power can stably be generated. Moreover, the amount of the electric power to be generated can properly be controlled, and hence the overcharging of the battery 52 can be prevented.

Next, a relation between the high potential avoidance control and battery power control will be described.

The controller 60 functions as a charging/discharging controller which controls the charging/discharging of a battery power by feedback control so that the battery power accumulated in the battery 52 can track a charging/discharging target value. More specifically, the controller 60 multiplies a deviation (e) between the battery power detected by an SOC sensor 73 and the charging/discharging target value by a proportional gain ($K_P$) to calculate a proportional type feedback correction value (a proportional term: $P=K_P \times e$). Moreover, the controller multiplies a temporal integral value ($\int(e)dt$) of the deviation (e) by an integral gain ($K_I$) to calculate an integral type feedback correction value (an integral term: $I=K_I \times \int(e) dt$), thereby calculating an added value of the above proportional and integral terms as the feedback correction value. The controller 60 controls the charging/discharging of the battery 52 based on the feedback correction value calculated in this manner so that the battery power matches the charging/discharging target value. The controller 60 updates and computes the proportional and integral terms for each predetermined computation cycle based on the deviation (e), and successively updates the feedback correction value.

Figure 4:
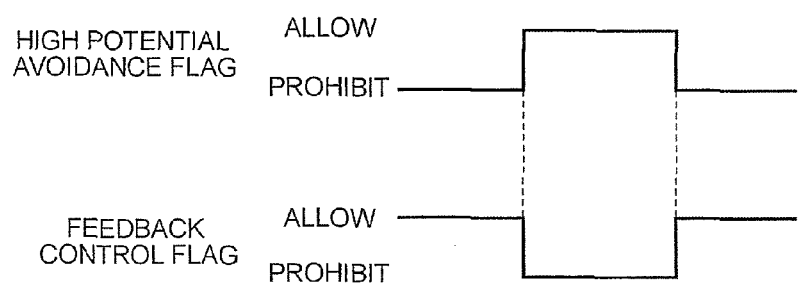
FIG. 4 is a diagram showing a relation between a flag indicating allowing/prohibiting of high potential avoidance control and a flag indicating allowing/prohibiting of feedback control.
Figure 5:
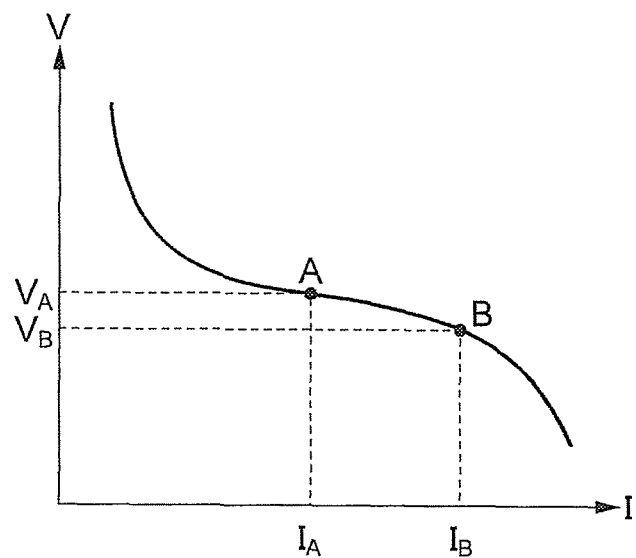
FIG. 5 is an I-V characteristic diagram of a fuel cell.
Figure 6:
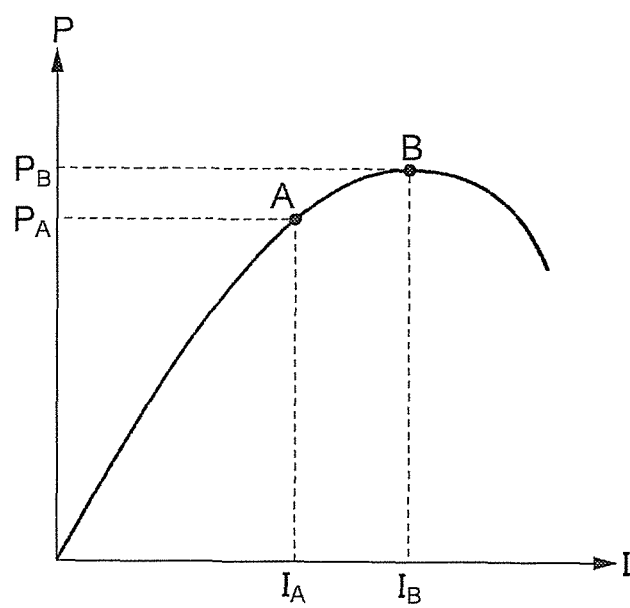
FIG. 6 is an I-P characteristic diagram of the fuel cell.

Here, in the high potential avoidance control, the output voltage of the fuel cell stack 20 is decreased to the high potential avoidance voltage or less irrespective of the system requirement power $P_A$, and hence the electric power which cannot completely be consumed by the traction motor 54 and the auxiliary machines 55 is charged into the battery 52. At this time, the battery 52 is overcharged in excess of the charging/discharging target value, and hence the integral term is wrongly integrated, whereby the feedback control might break down. As shown in FIG. 4, the controller 60 prohibits the feedback control on a condition that the high potential avoidance control is allowed, whereas the controller allows the feedback control on a condition that the high potential avoidance control is prohibited, whereby the above disadvantage is avoided.

It is to be noted that in the above embodiment, a utilizing configuration in which the fuel cell system 10 is used as the car-mounted power source system has been illustrated, but the utilizing configuration of the fuel cell system 10 is not limited to this example. For example, the fuel cell system 10 may be mounted as a power source for mobile bodies (a robot, ship, airplane, etc.) other than the fuel cell vehicle. Moreover, the fuel cell system 10 according to the present embodiment may be used as a power generation facility (a stational power generation system) for a housing, building or the like.

The invention claimed is:

1. A fuel cell system comprising:
   a fuel cell configured to generate an electric power upon receiving supply of a reactant gas;
   a controller programmed to perform control for high potential avoidance with an upper limit of an output voltage of the fuel cell as a high potential avoidance voltage lower than an open end voltage thereof, and
   an accumulator configured to accumulate a part of the electric power generated by the fuel cell;
   wherein the controller is further programmed to compute as a first system requirement power, the electric power output from the fuel cell when the output voltage of the fuel cell matches the high potential avoidance voltage and to compute a larger system requirement power out of the first system requirement power and a second system requirement power calculated from a load requirement as a system requirement power for the fuel cell;
   wherein the controller is further programmed to perform a feedback control of the charging/discharging of the accumulator so that the amount of the electric power to be charged into the accumulator matches a target value,
   wherein, when the charge state of the accumulator has a predetermined value or less, the high potential avoidance control is allowed, and
   wherein the controller is further programmed to prohibit the feedback control on a condition that the high potential avoidance control is allowed.

2. The fuel cell system according to claim 1, wherein the first system requirement power is calculated based on a relation between voltage/power characteristics of the fuel cell and the high potential avoidance voltage.

3. The fuel cell system according to claim 1, wherein the second system requirement power is calculated as an added value of a running electric power requirement value of a vehicle, a power consumption value of auxiliary machines and a charging/discharging requirement value of an accumulator.

4. A method for controlling a fuel cell system, the fuel cell system including a fuel cell configured to generate an electric power upon receiving supply of a reactant gas, an accumulator configured to accumulate a part of the electric power generated by the fuel cell, and a controller, the method comprising the steps of:
   performing control for high potential avoidance with an upper limit of an output voltage of the fuel cell as a high potential avoidance voltage lower than an open end voltage thereof with the controller;

computing as a first system requirement power, the electric power output from the fuel cell when the output voltage of the fuel cell matches the high potential avoidance voltage and to compute a larger system requirement power out of the first system requirement power and a second system requirement power calculated from a load requirement as a system requirement power for the fuel cell;

performing a feedback control of the charging/discharging of the accumulator so that the amount of the electric power to be charged into the accumulator matches a target value;

allowing, when the charge state of the accumulator has a predetermined value or less, the high potential avoidance control, and prohibiting the feedback control on a condition that the high potential avoidance control is allowed.

* * * * *

UNITED STATES PATENT AND TRADEMARK OFFICE
CERTIFICATE OF CORRECTION

PATENT NO.        : 8,722,266 B2
APPLICATION NO.   : 12/743919
DATED             : May 13, 2014
INVENTOR(S)       : Umayahara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this

Twenty-ninth Day of September, 2015

Michelle K. Lee
*Director of the United States Patent and Trademark Office*